(«12») United States Patent
Flores et al.

(10) Patent No.: US 9,016,947 B2
(45) Date of Patent: Apr. 28, 2015

(54) GROOVED LIMITER (71) Applicant: Seagate Technology LLC, Cupertino, CA (US)

(72) Inventors: Paco Gregor Flores, Felton, CA (US); Troy M. Herndon, San Jose, CA (US); Norbert Steven Parsoneault, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/924,225

(22) Filed: Jun. 21, 2013

(65) Prior Publication Data

US 2014/0376840 A1 Dec. 25, 2014

(51) Int. Cl.
F16C 32/06 (2006.01)
F16C 33/10 (2006.01)
F16C 17/04 (2006.01)
F16C 17/10 (2006.01)

(52) U.S. Cl.
CPC ........... *F16C 32/0662* (2013.01); *F16C 17/107* (2013.01); *F16C 33/103* (2013.01); *F16C 17/045* (2013.01); *F16C 32/0696* (2013.01)

(58) Field of Classification Search
CPC .... F16C 17/045; F16C 17/107; F16C 33/103; F16C 32/0696
USPC ................. 384/100, 105, 107, 112–113, 123
See application file for complete search history.

(56) References Cited

U.S. PATENT DOCUMENTS

| | | | | |
|---|---|---|---|---|
| 6,834,996 B2* | 12/2004 | Gomyo et al. | ................ | 384/112 |
| 6,982,510 B1 | 1/2006 | Ajello | | |
| 7,059,771 B2* | 6/2006 | Gomyo et al. | ................ | 384/100 |
| 7,073,944 B2 | 7/2006 | Aiello et al. | | |
| 7,134,792 B2 | 11/2006 | Aiello et al. | | |
| 7,372,663 B2 | 5/2008 | Leblanc et al. | | |
| 7,374,340 B2* | 5/2008 | Sekii et al. | ................... | 384/100 |
| 7,407,327 B2 | 8/2008 | Le et al. | | |
| 7,626,783 B2 | 12/2009 | LeBlanc et al. | | |
| 7,758,246 B2* | 7/2010 | Aiello et al. | ................. | 384/107 |
| 7,944,645 B2 | 5/2011 | LeBlanc et al. | | |
| 8,169,738 B1 | 5/2012 | Yawata et al. | | |
| 8,308,365 B2* | 11/2012 | Aiello et al. | ................. | 384/107 |
| 2003/0234589 A1* | 12/2003 | Parsoneault et al. | ............ | 310/90 |
| 2004/0013331 A1* | 1/2004 | Gomyo et al. | ................ | 384/107 |
| 2004/0091187 A1* | 5/2004 | Aiello et al. | ................. | 384/112 |
| 2004/0190802 A1* | 9/2004 | Gomyo et al. | ................ | 384/100 |
| 2005/0081384 A1 | 4/2005 | Inoue et al. | | |
| 2006/0043808 A1 | 3/2006 | Son | | |
| 2006/0051001 A1* | 3/2006 | Nishimura et al. | ........... | 384/100 |
| 2006/0083450 A1* | 4/2006 | Sekii et al. | ................... | 384/100 |
| 2007/0071376 A1* | 3/2007 | Lim | ............................. | 384/107 |
| 2008/0056104 A1* | 3/2008 | Nishimura et al. | ........... | 384/112 |
| 2013/0099625 A1 | 4/2013 | Kim | | |
| 2013/0142461 A1 | 6/2013 | Yu | | |

OTHER PUBLICATIONS

International Search Report and Written Opinion, mailed Oct. 8, 2014, PCT Application No. PCT/US2014/042809.

* cited by examiner

Primary Examiner — Marcus Charles (57) ABSTRACT

Provided herein is an apparatus, including a stationary component and a rotatable component; a fluid between the stationary component and the rotatable component; a limiter shoulder of the stationary component; a flanged limiter bushing of the rotatable component; and a separating means for separating the limiter shoulder and the limiter bushing, wherein the separating means comprises the fluid.

20 Claims, 5 Drawing Sheets

GROOVED LIMITER

BACKGROUND

A fluid dynamic bearing may be utilized in a spindle motor for a hard disk drive to provide stiffness to the spindle motor such that unwanted radial and/or angular motion in the spindle motor and/or between components thereof are minimized. Such a fluid dynamic bearing may use a fluid medium between two bearing surfaces to provide the stiffness to the spindle motor and/or between the components thereof. In operation, a grooved bearing surface of a fluid dynamic bearing pumps the fluid medium in response to relative rotational motion between the two bearing surfaces and, consequently, pressurizes the fluid dynamic bearing providing stiffness to the spindle motor and/or between the components thereof.

SUMMARY

Provided herein is an apparatus, including a stationary component and a rotatable component; a fluid between the stationary component and the rotatable component; a limiter shoulder of the stationary component; a flanged limiter bushing of the rotatable component; and a separating means for separating the limiter shoulder and the limiter bushing, wherein the separating means comprises the fluid.

These and other aspects, features, and embodiments may be better understood with reference to the following drawings, description, and appended claims.

DRAWINGS

Various embodiments are illustrated by way of example, not by way of limitation, in the figures of the accompanying drawings, in which like reference numerals refer to similar elements.

DESCRIPTION

Before particular embodiments are described in greater detail, it should be understood by persons having ordinary skill in the art that embodiments are not limited to the particular embodiments described and/or illustrated herein, as elements in such particular embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing particular embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps. For example, "first," "second," and "third" elements or steps need not necessarily appear in that order, and embodiments need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons having ordinary skill in the art to which the embodiments described herein pertain.

Embodiments will now be described in greater detail.

Figure 1:
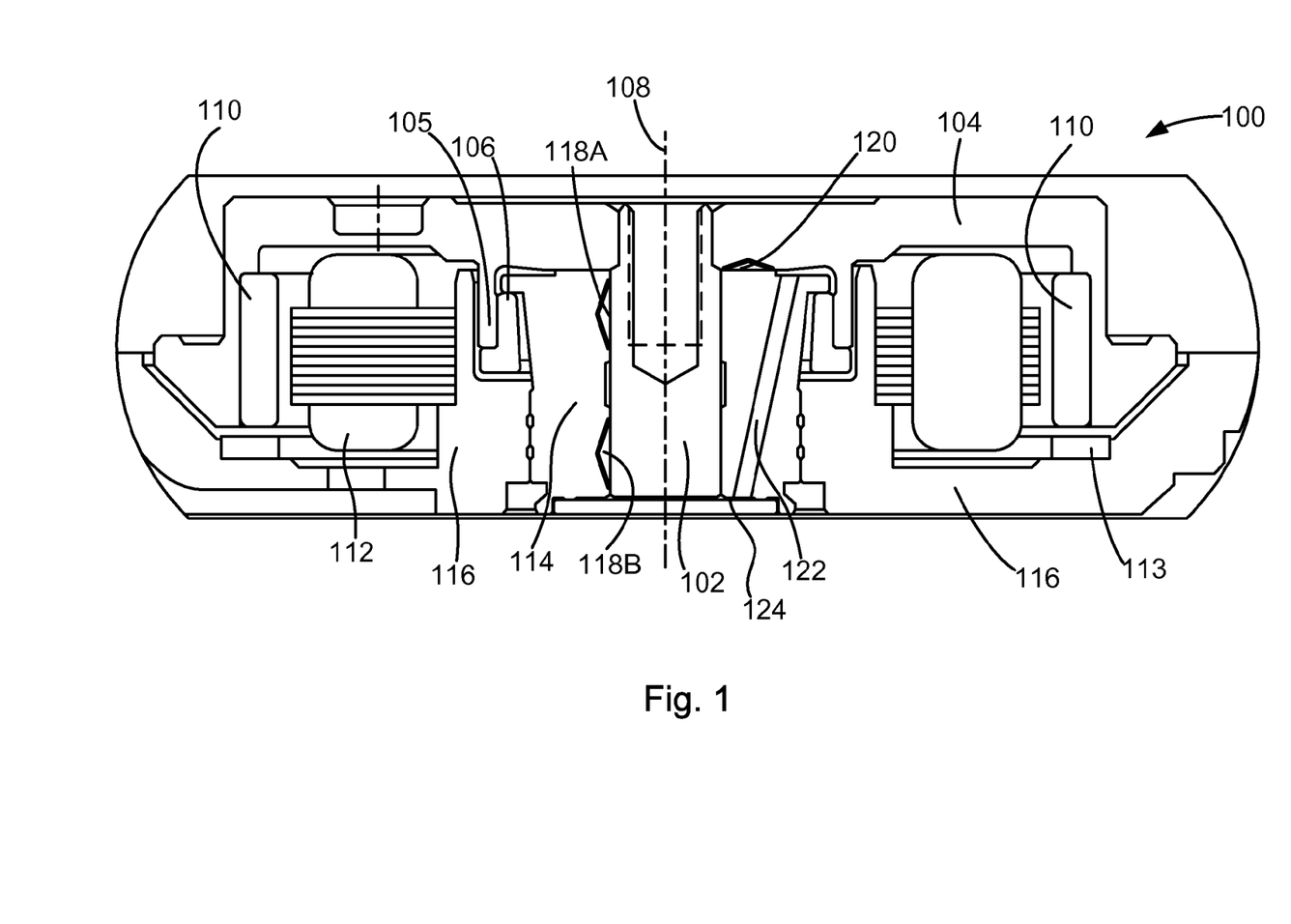
FIG. 1 provides a cross-sectional side view of a spindle motor for a hard disk drive in accordance with an embodiment.

FIG. 1 provides a cross-sectional side view of a spindle motor for a hard disk drive in accordance with an embodiment. Such a spindle motor 100 may be used in a hard disk drive such as the hard disk drive 400 described in FIG. 4.

The spindle motor 100 of FIG. 1 comprises a stationary component and a rotatable component positioned for relative rotation (e.g., RPM of about 4,800; 5,400; 7,200; 10,000; 15,000, etc.) with respect to each other. The stationary component includes, but is not limited to, components coupled to a base plate 116, such as a stator 112 and a sleeve 114, which sleeve 114 may be a flanged sleeve including a limiter shoulder of a limiter bearing as shown (see also FIGS. 2A-2D). Components and/or sub-components of the stationary component may also be referred to as stationary components herein, such as a stationary stator 112 and a stationary sleeve 114.

The rotatable component includes, but is not limited to, components such as a shaft 102, a hub 104, a magnet 110 coupled to the hub 104, and a limiter bushing 106 of a limiter bearing, which limiter bushing 106 may be a flanged limiter bushing as shown. Components and/or sub-components of the rotatable component may also be referred to as rotatable components herein, such as a rotatable shaft 102, a rotatable hub 104, a rotatable magnet 110, and a rotatable limiter bushing 106. The hub 104 includes a hub flange, which supports a disk pack for rotation about a central axis 108 of shaft 102. In operation, the magnet 110 coupled to the hub 104 interacts with the stator 112 to cause the hub 104 and disk pack to rotate.

One or more fluid dynamic bearings (e.g., journal bearing; thrust bearing; etc.) may be defined between the stationary component and the rotatable component. The spindle motor 100 of FIG. 1 includes, for example, a journal bearing 118A comprising a groove pattern (e.g., chevron-shaped groove pattern) on one of the sleeve 114 or the rotating shaft 102 as represented by the chevron-shaped groove on the sleeve 114. The journal bearing 118A, an upper journal bearing, along with lower journal bearing 118B, provides radial stiffness to the shaft 102 of the spindle motor 100, restricts radial movement of the shaft in a direction perpendicular to the central axis 108, and substantially prevents tilting of the shaft 102.

The spindle motor 100 of FIG. 1 also includes, for example, a thrust bearing 120 comprising a groove pattern (e.g., chevron-shaped groove pattern) on one of the sleeve 114 or the hub 104 as represented by the chevron-shaped groove on the hub 104. The thrust bearing 120 provides an upward force on the hub 104 to counterbalance downward forces such as the weight of the hub 104, axial forces between the hub 104 and a biasing magnet 113, and axial forces between the stator 112 and the magnet 110.

The spindle motor 100 of FIG. 1 may further include a fluid, fluid medium, or lubricating fluid 124 such as a liquid (e.g., lubricating oil), a gas, or a combination thereof between the stationary component and the rotatable component. As shown in FIG. 1, a recirculation path 122 extending from an inner radius at a bottom portion of the sleeve 114 to an outer radius at a top portion of the sleeve 114 fluidly connects the one or more fluid dynamic bearings with the lubricating fluid 124 and further supplies the lubricating fluid 124 to these one or more fluid dynamic bearings.

A limiter bearing of a spindle motor designed with smooth surfaces forming a closely spaced gap reduces the potential for damage during a shock event; however, such a closely spaced gap may lead to power loss and localized regions of low pressure in the lubricating fluid, which low pressure may cause lubricating fluid to ingest gas leading to reduced spindle motor performance. In view of the foregoing, a limiter bearing comprising at least one grooved surface may effectively provide a larger surface-to-surface gap, thereby drawing less power (i.e., reducing power loss) from the spindle motor in comparison to a limiter bearing with smooth surfaces. In addition, a limiter bearing comprising at least one grooved surface may provide localized regions of high pressure, thereby reducing potential for air ingestion into the lubricating fluid.

Each of FIGS. 2A, 2B, 2C, and 2D provides a close-up, cross-sectional side view of a limiter bearing for the spindle motor 100 of FIG. 1. Each of the foregoing limiter bearings comprises at least a limiter shoulder 115 (a feature of sleeve 114) and a flanged limiter bushing 106, which provide at least a means to retain the rotatable component of the spindle motor during a shock event. When a surface of the limiter shoulder 115, the flanged limiter bushing 106, and/or the hub 104 is grooved, the limiter bearing or a portion thereof may further provide an additional fluid dynamic bearing for the spindle motor 100 of FIG. 1. The additional fluid dynamic bearing may function as a journal bearing or a thrust bearing. In some embodiments, the limiter bearing or one or more portions thereof may comprise two additional fluid dynamic bearings, wherein one fluid dynamic bearing functions as a journal bearing, and wherein one fluid dynamic bearing functions as a thrust bearing.

With respect to the flanged limiter bushing 106 of the limiter bearing, the flanged limiter bushing 106 may be substantially L-shaped in view of FIGS. 2A, 2B, 2C, and 2D. As shown, the flanged limiter bushing 106 may be coupled to the hub 104, or the flanged limiter bushing 106 and the hub 104 may form a single, integral member (not shown). When the flanged limiter bushing 106 is coupled to the hub 104, the flanged limiter bushing 106 extends further toward the base plate 116 than a hub protrusion 105 of the hub 104. The flanged limiter bushing 106 may be coupled to the hub protrusion 105 such that the hub protrusion 105 abuts each of an axial surface and a radial surface of flanged limiter bushing 106. As shown, the axial surface of the flanged limiter bushing 106 may be a second major surface of the flanged limiter bushing 106, wherein a first major surface of the flanged limiter bushing 106 has a greater surface area than the second major surface, and wherein the first major surface of the flanged limiter bushing 106 is located at an inner radius of the spindle motor 100 when compared to the second major surface of the flanged limiter bushing 106, which is located at an outer radius of the of the spindle motor 100. The foregoing radial surface of the flanged limiter bushing 106 may be a minor radial surface of a flanged portion of the flanged limiter bushing 106. In the orientation provided in each of FIGS. 2A, 2B, 2C, and 2D (as well as FIG. 1), the hub protrusion 105 may be described as sitting on the flanged portion of the flanged limiter bushing 106. Having a flanged limiter bushing 106, as opposed to a flanged hub protrusion, is advantageous in that the hub 104 does not require as much processing or machining as it otherwise would.

Figure 2A:
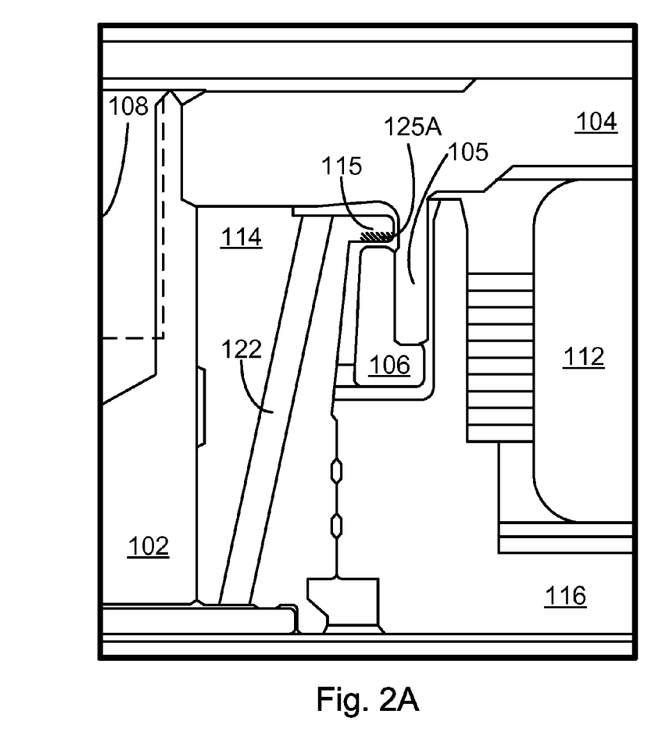
FIGS. 2A, 2B, 2C, and 2D provide close-up, cross-sectional side views of limiter bearings for a spindle motor of a hard disk drive in accordance with some embodiments.

FIG. 2A provides a close-up, cross-sectional side view of a limiter bearing comprising an additional fluid dynamic bearing for the spindle motor 100 of FIG. 1, which additional fluid dynamic bearing may function as a thrust bearing. As shown, such a thrust bearing comprises grooves 125A on a portion of a surface of the limiter shoulder 115. The portion of the surface of the limiter shoulder 115 comprising grooves 125A may be a radial portion of the surface of the limiter shoulder 115 in close proximity to an ungrooved, radial portion of a surface of the limiter bushing 106.

Figure 2B:
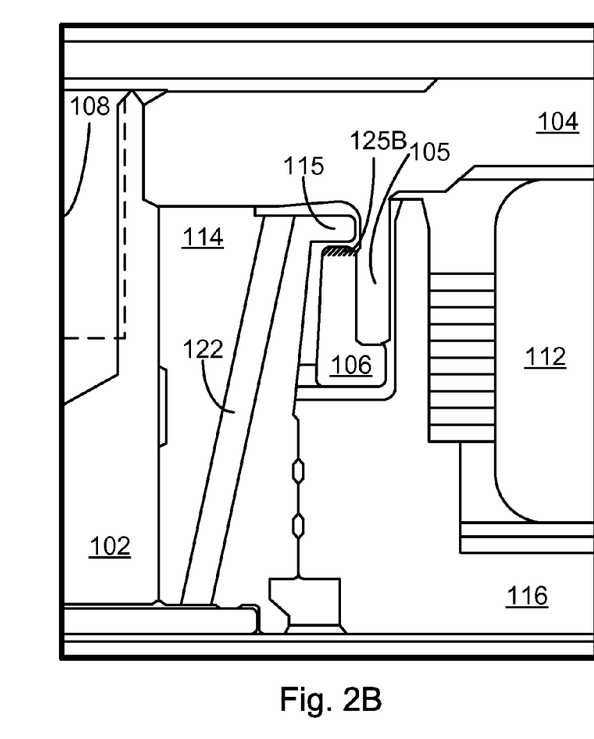

FIG. 2B provides a close-up, cross-sectional side view of a limiter bearing comprising an additional fluid dynamic bearing for the spindle motor 100 of FIG. 1, which additional fluid dynamic bearing may function as a thrust bearing. As shown, such a thrust bearing comprises grooves 125B on a portion of a surface of the limiter bushing 106. The portion of the surface of the limiter bushing 106 comprising grooves 125B may be a radial portion of the surface of the limiter bushing 106 in close proximity to an ungrooved, radial portion of a surface of the limiter shoulder 115.

Figure 3A:
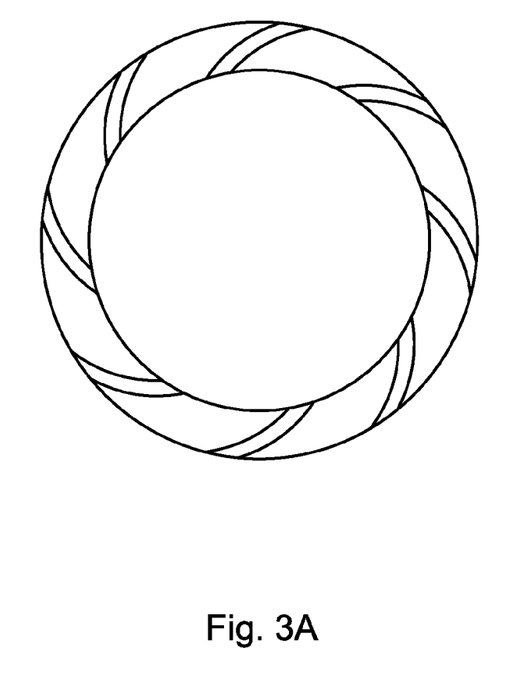
FIGS. 3A and 3B provide a plan view of grooved components of a spindle motor for a hard disk drive in accordance with some embodiments.
Figure 3B:
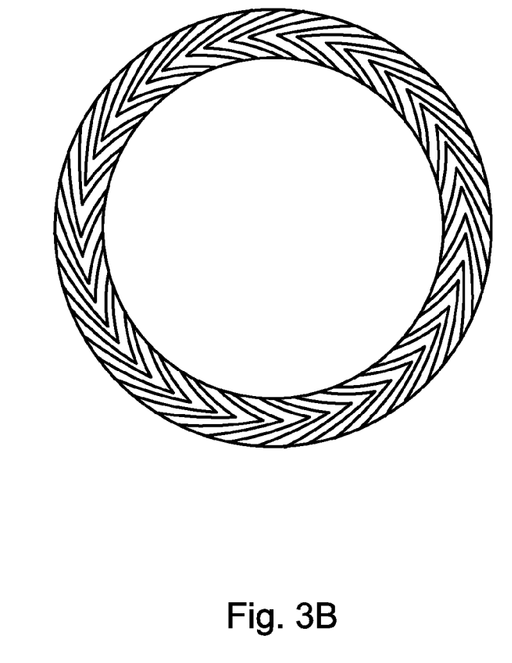

Each of FIGS. 3A and 3B provide a groove pattern that may be utilized on the radial portion of the surface of the limiter shoulder 115 or the radial portion of the surface of the limiter bushing 106 in a fluid dynamic bearing such as a thrust bearing. FIG. 3A, for example, provides a spiral-type groove pattern that may be utilized on the radial portion of the surface of the limiter shoulder 115 or the radial portion of the surface of the limiter bushing 106 in a fluid dynamic bearing such as a thrust bearing. FIG. 3B, for example, provides a chevron-type groove pattern that may be utilized on the radial portion of the surface of the limiter shoulder 115 or the radial portion of the surface of the limiter bushing 106 in a fluid dynamic bearing such as a thrust bearing. The groove patterns of FIGS. 3A and 3B are illustrative only, as any suitable groove pattern may be used on the radial portion of the surface of the limiter shoulder 115 or the radial portion of the surface of the limiter bushing 106 to induce fluid flow between the bearing surfaces, to generate a localized region of high pressure between the bearing surfaces, and/or to provide lift to counterbalance downward forces (e.g., the weight of the hub 104). For example, a herringbone or a sinusoidal groove pattern may be used on the radial portion of the surface of the limiter shoulder 115 or the radial portion of the surface of the limiter bushing 106.

Figure 2C:
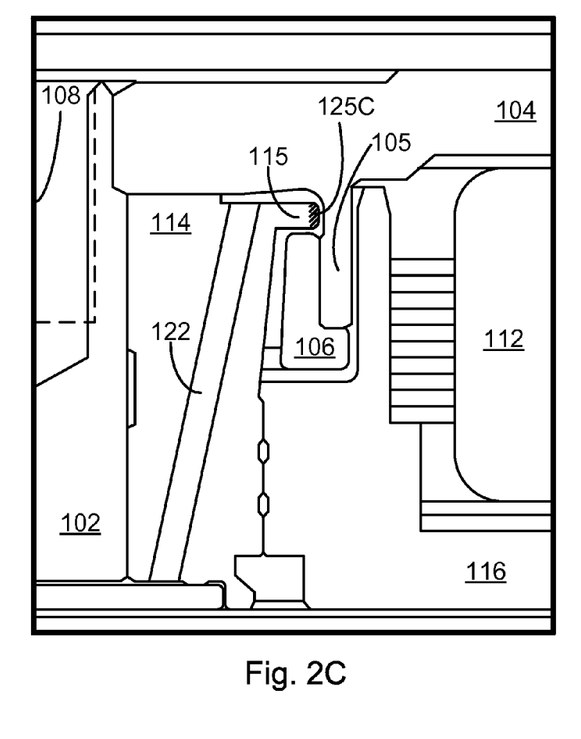

FIG. 2C provides a close-up, cross-sectional side view of a limiter bearing comprising an additional fluid dynamic bearing for the spindle motor 100 of FIG. 1, which additional fluid dynamic bearing may function as a journal bearing. As shown, such a journal bearing comprises grooves 125C on a portion of a surface of the limiter shoulder 115. The portion of the surface of the limiter shoulder 115 comprising grooves 125A may be an axial portion of the surface of the limiter shoulder 115 in close proximity to an ungrooved, axial portion of a surface of the hub 104.

Figure 2D:
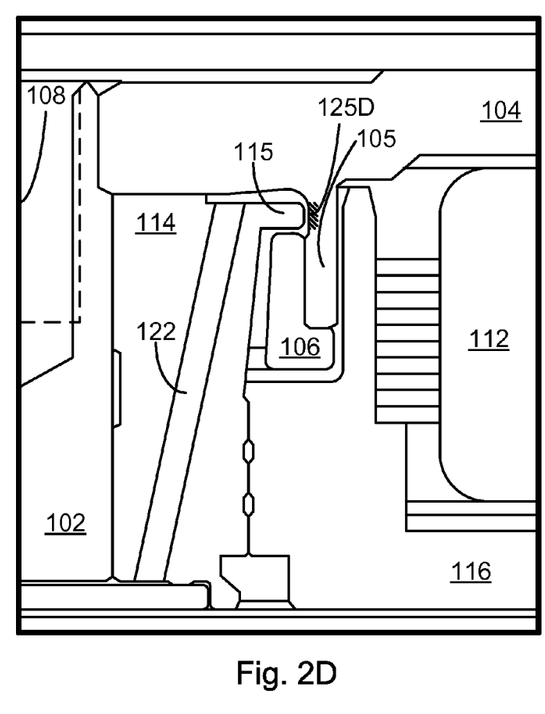

FIG. 2D provides a close-up, cross-sectional side view of a limiter bearing comprising an additional fluid dynamic bearing for the spindle motor 100 of FIG. 1, which additional fluid dynamic bearing may function as a journal bearing. As shown, such a journal bearing comprises grooves 125D on a portion of a surface of the hub 104. The portion of the surface of the hub 104 comprising grooves 125D may be an axial portion of the surface of the hub 104 in close proximity to an ungrooved, axial portion of a surface of the limiter shoulder 115.

The limiter bearing or one or more portions thereof may comprise two additional fluid dynamic bearings, wherein a first fluid dynamic bearing may function as a thrust bearing, and wherein a second fluid dynamic bearing may function as a journal bearing. In some embodiments, for example, both a radial portion of the surface of the limiter shoulder 115 may be grooved (e.g., as in FIG. 2A) and an axial portion of the surface of the limiter shoulder 115 may be grooved (e.g., as in FIG. 2C). In such embodiments, the grooved radial portion of the surface of the limiter shoulder 115 and an ungrooved, radial portion of the surface of the limiter bushing 106 may form a first fluid dynamic bearing (e.g., a thrust bearing) while the grooved axial portion of the surface of the limiter shoulder 115 in close proximity to an ungrooved, axial portion of the surface of the hub 104 may form a second fluid dynamic bearing (e.g., a journal bearing). In some embodiments, for example, both a radial portion of the surface of the flanged limiter bushing 106 proximate to the limiter shoulder 115 may be grooved (e.g., as in FIG. 2B) and an axial portion of the surface of the rotatable component proximate to the limiter shoulder 115 may be grooved (e.g., as in FIG. 2D). In such embodiments, the grooved radial portion of the surface of the flanged limiter bushing 106 proximate to an ungrooved, radial portion of the surface of the limiter shoulder 115 may form a first fluid dynamic bearing (e.g., a thrust bearing) and the grooved axial portion of the surface of the rotatable component proximate an ungrooved, axial portion of the surface of the limiter shoulder 115 may form a second fluid dynamic bearing (e.g., a journal bearing).

Any of a variety of groove patterns may be utilized on the axial portion of the surface of the limiter shoulder 115 or the axial portion of the surface of the hub 104 in a fluid dynamic bearing such as a journal bearing. For example, a chevron-type groove pattern may be utilized on the axial portion of the surface of the limiter shoulder 115 or the axial portion of the surface of the hub 104 in a fluid dynamic bearing such as a journal bearing. Any of a variety of groove patterns may be used on the axial portion of the surface of the limiter shoulder 115 or the axial portion of the surface of the hub 104 to induce fluid flow between the bearing surfaces, to generate a localized region of high pressure between the bearing surfaces, and/or to provide stiffness to the spindle motor such that unwanted radial and/or angular motion in the spindle motor and/or between components thereof are minimized.

The additional fluid dynamic bearing (or fluid dynamic bearings), whether a thrust bearing or a journal bearing, may be designed such that the depth of the grooves of the groove pattern on the surface of the limiter shoulder 115, the surface of the limiter bushing 106, and/or the surface of the hub 104 is about 1.5 times the distance between adjacent surfaces of the fluid dynamic bearing. In some embodiments, for example, the depth of the grooves is at least 1 µm, 3 µm, 5 µm, 10 µm, 15 µm, 20 µm, 25 µm, 30 µm, or 35 µm deep, optionally equal to about 1.5 times the distance between adjacent surfaces of the fluid dynamic bearing. In some embodiments, for example, the depth of the grooves is no more than 40 µm, 35 µm, 30 µm, 25 µm, 20 µm, 15 µm, 10 µm, 5 µm, or 3 µm deep, optionally equal to about 1.5 times the distance between adjacent surfaces of the fluid dynamic bearing.

Combinations of the foregoing may also be used to describe the depth of the grooves. In some embodiments, for example, the depth of the grooves is at least 1 µm deep and no more than 40 µm deep (i.e., between 1 µm and 40 µm deep), such as at least 3 µm deep and no more than 35 µm deep (i.e., between 3 µm and 35 µm deep), including at least 5 µm deep and no more than 35 µm deep (i.e., between 5 µm and 35 µm deep), and further including at least 15 µm deep and no more than 25 µm deep (i.e., between 15 µm and 25 µm deep), optionally equal to about 1.5 times the distance between adjacent surfaces of the fluid dynamic bearing. For example, the additional fluid dynamic bearing may be a thrust bearing between a surface of a limiter shoulder and a surface of a limiter bushing, wherein the distance between a radial surface of the limiter shoulder and a radial surface of the limiter bushing is about 20 µm, and wherein the depth of the grooves of the thrust bearing is about 1.5 times the distance between the radial surface of the limiter shoulder 115 and the radial surface of the limiter bushing or about 30 µm.

The additional fluid dynamic bearing (or fluid dynamic bearings), whether a thrust bearing or a journal bearing, may be further designed for standard operation, a shock event, or a combination thereof.

In some embodiments, the additional fluid dynamic bearing may be designed for standard operation. In such embodiments, for example, the distance between a first surface of the fluid dynamic bearing and a second surface of the fluid dynamic bearing during standard operation may be at least 3 µm and the depth of the grooves of the fluid dynamic bearing may be at least 1.5 times the distance between the first and second surfaces during standard operation or at least 4.5 µm.

In some embodiments, the additional fluid dynamic bearing may be designed for a shock event, during which the distance between a first surface of the fluid dynamic bearing and a second surface of the fluid dynamic bearing may become less 3 µm. In such embodiments, the depth of the grooves of the fluid dynamic bearing may be about 1.5 times the distance between the first and second surfaces during the shock event or less than 4.5 µm. In such embodiments, the groove-to-pitch ratio ("GPR"), as measured in a circumferential direction, may be relatively low providing larger land areas (i.e., ungrooved areas between grooves) for increased damping.

In some embodiments, the additional fluid dynamic bearing may be designed for a combination of standard operation and a shock event. In such embodiments, the depth of the grooves of the fluid dynamic bearing may vary, wherein some of the grooves or sections of the grooves of a groove pattern may be designed for standard operation and some of the grooves or sections of the grooves of the groove pattern may be designed for a shock event. For example, the additional fluid dynamic bearing may comprise a groove pattern comprising an inner section where the grooves are relatively deeper for standard operation and an outer section where the grooves are relatively shallower for a shock event. Using the chevron-type groove pattern FIG. 3B as an illustrative example, the inner section where the grooves are relatively deeper may include an inner annulus co-located with the vertices of the chevron-type grooves, and the outer section where the grooves are relatively shallower may include a pair of outer annuli co-located with the termini of the chevron-type grooves.

Figure 4:
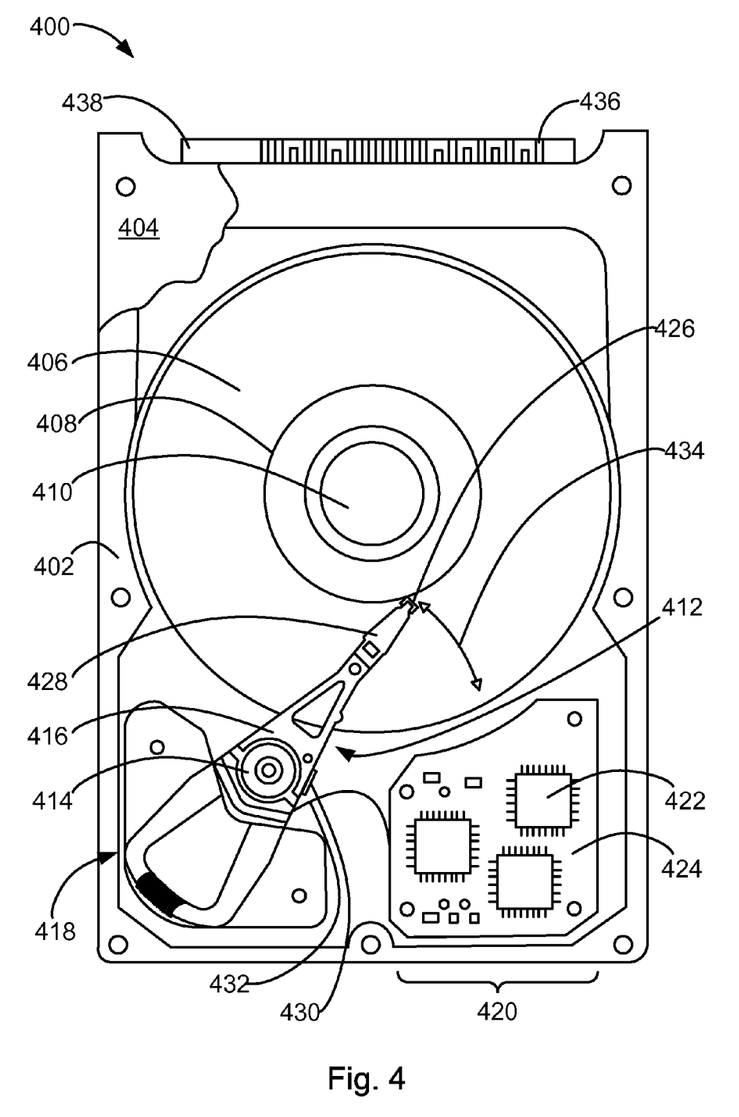
FIG. 4 provides a plan view of a hard disk drive in accordance with an embodiment.

FIG. 4 provides a plan view of a hard disk drive in which a limiter bearing comprising a fluid dynamic bearing described herein may be used. A hard disk drive 400 generally includes a base plate 402 and a cover 404 that may be disposed on the base plate 402 to define an enclosed housing for various hard disk drive components. The hard disk drive 400 includes one or more data storage disks 406 of computer-readable data storage media arranged in a disk pack. Typically, both of the major surfaces of each data storage disk 406 include a plurality of concentrically disposed tracks for data storage purposes. Each data storage disk 406 is mounted on a hub 408, which in turn is rotatably interconnected with the base plate 402 and/or cover 404. Multiple data storage disks 406 are typically mounted in vertically spaced and parallel relation on the hub 408. A spindle motor 410 rotates the data storage disks 406.

The hard disk drive 400 also includes an actuator arm assembly 412 that pivots about a pivot bearing 414, which in turn is rotatably supported by the base plate 402 and/or cover 404. The actuator arm assembly 412 includes one or more individual rigid actuator arms 416 that extend out from near the pivot bearing 414. Multiple actuator arms 416 are typically disposed in vertically spaced relation, with one actuator arm 416 being provided for each major data storage surface of each data storage disk 406 of the hard disk drive 400. Other types of actuator arm assembly configurations could be utilized as well, an example being an "E" block having one or more rigid actuator arm tips, or the like, that cantilever from a common structure. Movement of the actuator arm assembly 412 is provided by an actuator arm drive assembly, such as a voice coil motor 418 or the like. The voice coil motor 418 is a magnetic assembly that controls the operation of the actuator arm assembly 412 under the direction of control electronics 420.

The control electronics 420 may include a plurality of integrated circuits 422 coupled to a printed circuit board 424. The control electronics 420 may be coupled to the voice coil motor assembly 418, a slider 426, or the spindle motor 410 using interconnects that can include pins, cables, or wires (not shown).

A load beam or suspension 428 is attached to the free end of each actuator arm 416 and cantilevers therefrom. Typically, the suspension 428 is biased generally toward its corresponding data storage disk 406 by a spring-like force. The slider 426 is disposed at or near the free end of each suspension 428. What is commonly referred to as the read/write head (e.g., transducer) is appropriately mounted as a head unit (not shown) under the slider 426 and is used in hard disk drive read/write operations. The head unit under the slider 426 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 426 is connected to a preamplifier 430, which is interconnected with the control electronics 420 of the hard disk drive 400 by a flex cable 432 that is typically mounted on the actuator arm assembly 412. Signals are exchanged between the head unit and its corresponding data storage disk 406 for hard disk drive read/write operations. In this regard, the voice coil motor 418 is utilized to pivot the actuator arm assembly 412 to simultaneously move the slider 426 along a path 434 and across the corresponding data storage disk 406 to position the head unit at the appropriate position on the data storage disk 406 for hard disk drive read/write operations.

When the hard disk drive 400 is not in operation, the actuator arm assembly 412 is pivoted to a "parked position" to dispose each slider 426 generally at or beyond a perimeter of its corresponding data storage disk 406, but in any case in vertically spaced relation to its corresponding data storage disk 406. In this regard, the hard disk drive 400 includes a ramp assembly (not shown) that is disposed beyond a perimeter of the data storage disk 406 to both move the corresponding slider 426 vertically away from its corresponding data storage disk 406 and to also exert somewhat of a retaining force on the actuator arm assembly 412.

Exposed contacts 436 of a drive connector 438 along a side end of the hard disk drive 400 may be used to provide connectivity between circuitry of the hard disk drive 400 and a next level of integration such as an interposer, a circuit board, a cable connector, or an electronic assembly. The drive connector 438 may include jumpers (not shown) or switches (not shown) that may be used to configure the hard disk drive 400 for user specific features or configurations. The jumpers or switches may be recessed and exposed from within the drive connector 438.

As such, provided herein is an apparatus, comprising a stationary component; a rotatable component, wherein the stationary component and the rotatable component are positioned for relative rotation; a sleeve of the stationary component, wherein the sleeve comprises a limiter shoulder; and a flanged limiter bushing of the rotatable component, wherein a portion of a surface of the limiter shoulder, a portion of a surface of the flanged limiter bushing proximate to the limiter shoulder, or a portion of a surface of the rotatable component proximate to the limiter shoulder is grooved. In some embodiments, a radial portion of the surface of the limiter shoulder is grooved. In some embodiments, an axial portion of the surface of the limiter shoulder is grooved. In some embodiments, both a radial portion of the surface of the limiter shoulder is grooved and an axial portion of the surface of the limiter shoulder is grooved. In some embodiments, a radial portion of the surface of the flanged limiter bushing proximate to the limiter shoulder is grooved. In some embodiments, an axial portion of the surface of the rotatable component proximate to the limiter shoulder is grooved. In some embodiments, both a radial portion of the surface of the flanged limiter bushing proximate to the limiter shoulder is grooved and an axial portion of the surface of the rotatable component proximate to the limiter shoulder is grooved. In some embodiments, the apparatus further comprises a recirculation path for recirculating a lubricating oil, wherein the recirculation path extends from an inner radius at a bottom portion of the sleeve to an outer radius at a top portion of the sleeve. In some embodiments, the recirculation path fluidly connects two or more fluid dynamic bearings of the apparatus.

Also provided herein is an apparatus, comprising a stationary limiter shoulder; a rotatable flanged limiter bushing; and a fluid dynamic bearing formed by the stationary limiter shoulder and the rotatable flanged limiter bushing. In some embodiments, a radial portion of a surface of the limiter shoulder is grooved. In some embodiments, an axial portion of a surface of the limiter shoulder is grooved. In some embodiments, a radial portion of a surface of the flanged limiter bushing proximate to the limiter shoulder is grooved. In some embodiments, an axial portion of a surface of a rotatable hub proximate to the limiter shoulder is grooved. In some embodiments, the apparatus further comprises a recirculation path for recirculating lubricating oil, wherein the recirculation path extends from an inner radius at a bottom portion of a sleeve comprising the limiter shoulder to an outer radius at a top portion of the sleeve. In some embodiments, the recirculation path fluidly connects two or more fluid dynamic bearings of the apparatus.

Also provided herein is an apparatus, comprising a stationary component; a rotatable component, wherein the stationary component and the rotatable component are positioned for relative rotation; a sleeve of the stationary component, wherein the sleeve comprises a surface of a limiter shoulder;

a surface of a flanged limiter bushing; and a surface of the rotatable component, wherein one of a portion of the surface of the limiter shoulder, a portion of the surface of the flanged limiter bushing proximate to the limiter shoulder, or a portion of the surface of the rotatable component proximate to the limiter shoulder is grooved to form a fluid dynamic bearing. In some embodiments, a radial portion of the surface of the limiter shoulder is grooved. In some embodiments, an axial portion of the surface of the limiter shoulder is grooved. In some embodiments, a radial portion of the surface of the flanged limiter bushing proximate to the limiter shoulder is grooved. In some embodiments, an axial portion of the surface of the rotatable component proximate to the limiter shoulder is grooved. In some embodiments, the apparatus further comprises a recirculation path for recirculating lubricating oil, wherein the recirculation path extends from an inner radius at a bottom portion of the sleeve to an outer radius at a top portion of the sleeve. In some embodiments, the recirculation path fluidly connects two or more fluid dynamic bearings of the apparatus.

Also provided herein is an apparatus, comprising: a stationary component and a rotatable component; a fluid between the stationary component and the rotatable component; a limiter shoulder of the stationary component; a flanged limiter bushing of the rotatable component; and a separating means for separating the limiter shoulder and the limiter bushing, wherein the separating means comprises the fluid. In some embodiments, the separating means comprises a fluid dynamic bearing. In some embodiments, a radial surface of the limiter shoulder is grooved. In some embodiments, an axial surface of the limiter shoulder is grooved. In some embodiments, a radial surface of the flanged limiter bushing is grooved. In some embodiments, an axial surface of a hub of the rotatable component is grooved.

Also provided herein is an apparatus, comprising a stationary component; a rotatable component, wherein the stationary component and the rotatable component are positioned for relative rotation; a sleeve of the stationary component, wherein the sleeve comprises a limiter shoulder; a flanged limiter bushing; and a separating means for separating a surface of the limiter shoulder and a surface of the rotatable component, the surface of the limiter shoulder and a surface of the flanged limiter bushing, or a combination thereof. In some embodiments, the separating means comprises a fluid dynamic bearing. In some embodiments, a radial surface of the limiter shoulder is grooved. In some embodiments, an axial surface of the limiter shoulder is grooved. In some embodiments, a radial surface of the flanged limiter bushing is grooved. In some embodiments, an axial surface of the rotatable component is grooved.

While embodiments have been described and/or illustrated by means of various examples, and while these examples have been described in considerable detail, it is not the intention of the applicant(s) to restrict or in any way limit the scope to such detail. Additional adaptations and/or modifications of embodiments may readily appear to persons having ordinary skill in the art, and, in broader aspects, embodiments may encompass these adaptations and/or modifications. Accordingly, departures may be made from the foregoing embodiments and/or examples without departing from the scope, which scope is limited only by the following claims when appropriately construed. The implementations described above and other implementations are within the scope of the following claims.

What is claimed is:

1. An apparatus, comprising:
a stationary component;
a rotatable component,
wherein the stationary component and the rotatable component are positioned for relative rotation;
a sleeve of the stationary component,
wherein the sleeve comprises a limiter shoulder;
a flanged limiter bushing of the rotatable component,
wherein a portion of a surface of the limiter shoulder, a portion of a surface of the flanged limiter bushing proximate to the limiter shoulder, or a portion of a surface of the rotatable component proximate to the limiter shoulder is grooved; and
a fluid dynamic limiter bearing formed by the limiter shoulder and the flanged limiter bushing.

2. The apparatus of claim 1,
wherein a radial portion of the surface of the limiter shoulder is grooved or an axial portion of the surface of the limiter shoulder is grooved.

3. The apparatus of claim 1,
wherein both a radial portion of the surface of the limiter shoulder is grooved and an axial portion of the surface of the limiter shoulder is grooved.

4. The apparatus of claim 1,
wherein a radial portion of the surface of the flanged limiter bushing proximate to the limiter shoulder is grooved or an axial portion of the surface of the rotatable component proximate to the limiter shoulder is grooved.

5. The apparatus of claim 1,
wherein both a radial portion of the surface of the flanged limiter bushing proximate to the limiter shoulder is grooved and an axial portion of the surface of the rotatable component proximate to the limiter shoulder is grooved.

6. The apparatus of claim 1,
wherein the apparatus further comprises a recirculation path for recirculating a lubricating oil, and
wherein the recirculation path extends from an inner radius at a bottom portion of the sleeve to an outer radius at a top portion of the sleeve.

7. The apparatus of claim 6,
wherein the recirculation path fluidly connects two or more fluid dynamic bearings of the apparatus.

8. An apparatus, comprising:
a stationary limiter shoulder;
a rotatable flanged limiter bushing; and
a fluid dynamic bearing formed by the stationary limiter shoulder and the rotatable flanged limiter bushing.

9. The apparatus of claim 8,
wherein a radial portion of a surface of the limiter shoulder is grooved.

10. The apparatus of claim 8,
wherein an axial portion of a surface of the limiter shoulder is grooved.

11. The apparatus of claim 8,
wherein a radial portion of a surface of the flanged limiter bushing proximate to the limiter shoulder is grooved.

12. The apparatus of claim 8,
wherein an axial portion of a surface of a rotatable hub proximate to the limiter shoulder is grooved.

13. The apparatus of claim 8,
wherein the apparatus further comprises a recirculation path for recirculating lubricating oil, and
wherein the recirculation path extends from an inner radius at a bottom portion of a sleeve comprising the limiter shoulder to an outer radius at a top portion of the sleeve.

14. The apparatus of claim 13,
wherein the recirculation path fluidly connects two or more fluid dynamic bearings of the apparatus.

15. An apparatus, comprising:
a stationary component and a rotatable component;
a fluid between the stationary component and the rotatable component;
a limiter shoulder of the stationary component;
a flanged limiter bushing of the rotatable component; and
a fluid dynamic limiter bearing formed by the fluid at the limiter shoulder and the flanged limiter bushing.

16. The apparatus of claim 15, wherein the fluid dynamic limiter bearing is a first fluid dynamic limiter bearing, wherein the apparatus further comprises a second fluid dynamic bearing formed by the fluid at the limiter shoulder and the flanged limiter bushing.

17. The apparatus of claim 16, wherein a radial surface of the limiter shoulder is grooved.

18. The apparatus of claim 16, wherein an axial surface of the limiter shoulder is grooved.

19. The apparatus of claim 16, wherein a radial surface of the flanged limiter bushing is grooved.

20. The apparatus of claim 16, wherein an axial surface of a hub of the rotatable component is grooved.

\* \* \* \* \*